United States Patent [19]

Hart

[11] 4,071,660

[45] Jan. 31, 1978

[54] ELECTRODE FOR A ZINC-CHLORIDE BATTERY AND BATTERIES CONTAINING THE SAME

[75] Inventor: Thomas G. Hart, Royal Oak, Mich.

[73] Assignee: Energy Development Associates, Madison Heights, Mich.

[21] Appl. No.: 680,141

[22] Filed: Apr. 26, 1976

[51] Int. Cl.² .......................................... H01M 10/38
[52] U.S. Cl. .................... 429/15; 429/46;105;199;229
[58] Field of Search ................... 429/14, 46, 70, 72, 429/229-231, 166, 49, 15, 199, 17

[56] References Cited

U.S. PATENT DOCUMENTS

| 852,464 | 5/1907 | Sokal | 429/70 |
| 3,713,888 | 1/1973 | Symons | 429/199 X |
| 3,772,085 | 11/1973 | Bjorkman | 429/46 X |

Primary Examiner—Anthony Skapars
Attorney, Agent, or Firm—Ostrolenk, Faber, Gerb & Soffen

[57] ABSTRACT

Hollow rod-shaped porous zinc electrodes are employed in a rechargeable zinc-chloride battery to decrease the possibility of shorting within the battery, to decrease hydrogen evolution and to increase the efficiency of the battery. Dechlorinated electrolyte is flowed through the Zn electrode and Zn deposit thereon so as to avoid black zinc at low current densities and increase the efficiency of the battery.

7 Claims, 4 Drawing Figures

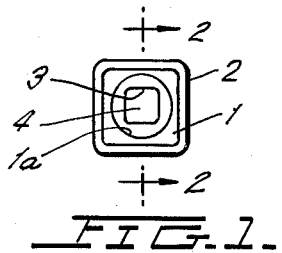
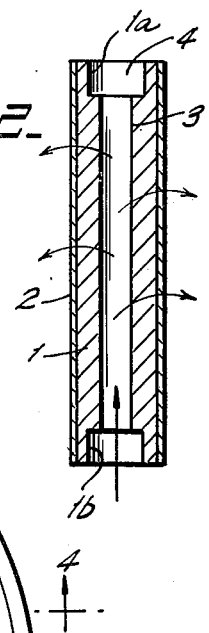
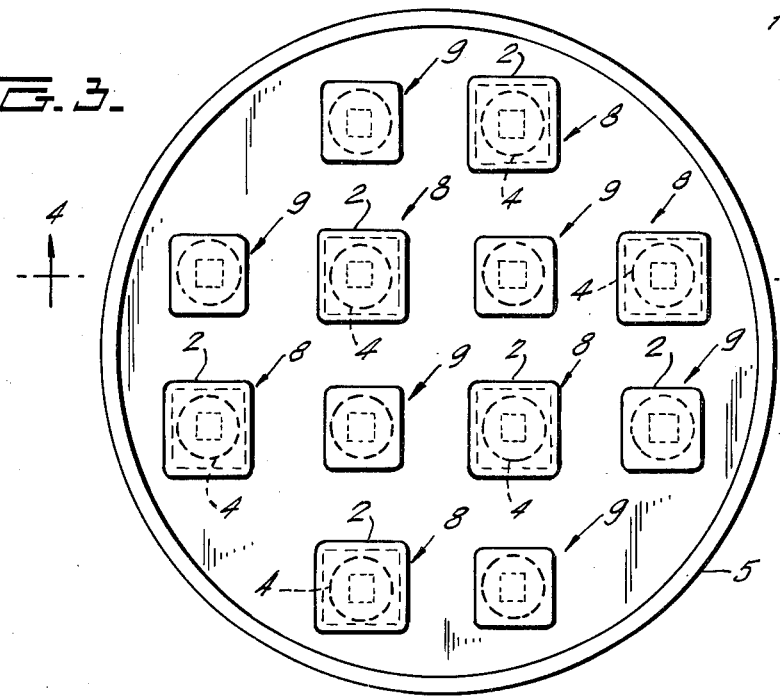
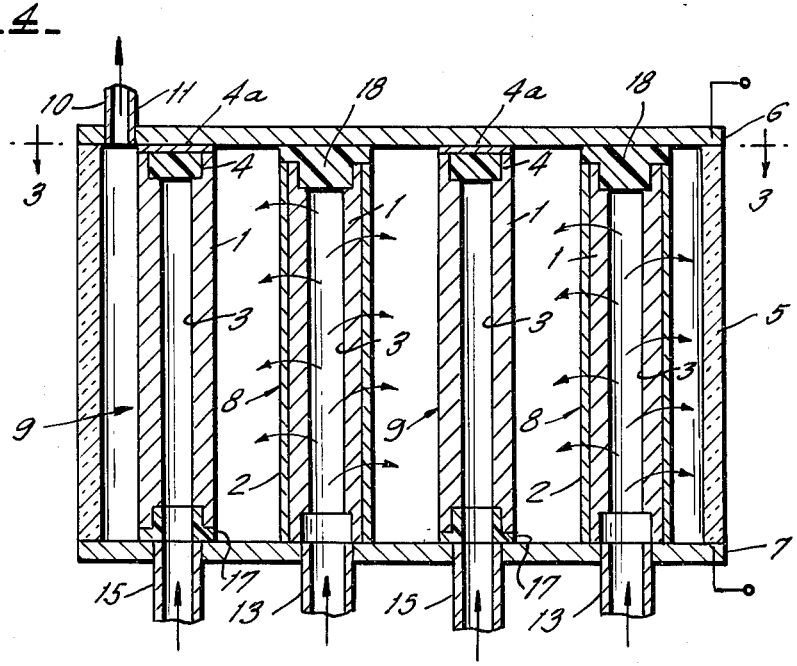

ELECTRODE FOR A ZINC-CHLORIDE BATTERY AND BATTERIES CONTAINING THE SAME

BACKGROUND OF THE INVENTION

Electrical energy storage systems or secondary batteries of the so-called high energy density (H.E.D.) type have assumed increasing importance in recent years because of their capability of supplying upwards of 50 watt hours of electrical energy per pound of weight. The high energy capacity and compactness of such H.E.D. batteries renders them particularly satisfactory for use as principal or auxiliary sources of electrical energy in both mobile and stationary power plant systems. A metal/halogen/hydrate secondary storage battery of the foregoing type is described in detail in U.S. Pat. No. 3,713,888, the teachings of which are hereby incorporated by reference.

During the charging of high energy density secondary batteries using chlorine and a highly electropositive metal as electrodes and reactants, an aqueous metal chloride salt electrolyte is circulated through the battery cells, plating out the metal on an electrode base and generating chlorine at the other electrode. In cells where the electrodes are of zinc and chlorine on a carbon base, an aqueous zinc chloride electrolyte is used and continuously circulates through the cells during the charging and discharging operations. Zinc is deposited on the active surface of the zinc electrode during charging, and is consumed during discharging.

The quality of the zinc deposited on the zinc electrode during the charging operation is prone to a number of quality defects which, in turn, detract from the performance of the battery. Two of the principal quality defects are dendrites, i.e., protuberances out of the surface of the zinc, and a low density semi-amorphous zinc which is known as "black zinc". Because the spacing between electrodes is small, as it must be, the growth of dendrites and black zinc causes shorting within the battery, can cause increased hydrogen evolution and result in lowered efficiency. It is apparent that avoidance of the formation of dendrites and of black zinc is desirable. Unfortunately, dendrite formation and black zinc formation generally act as if they were in equilibrium with each other. The higher the charge current density, the greater the tendency to form dendrites and, conversely, the lower the charge current density, the greater the tendency to form black zinc. There has not been a current density which is low enough to avoid dendrites, yet high enough to avoid black zinc formation.

Another problem with the electrodes heretofore used in the zinc-chlorine H.E.D. battery is that conventional flat plate electrodes and electrode arrangements are not particularly well suited for use in a battery where the electrolyte circulates during charging and discharging. Electrode material such as graphite is easily deformed and broken into thin sections, particulary if substantial pressure and pressure differentials are applied to the material. In the flowing electrolyte zinc-chlorine battery, the electrode material of choice is graphite and both substantial pressures and pressure differences are encountered. Furthermore, the fabrication of electrodes with large flat areas, and with a plurality of parallel channels in one surface of the electrode is complex and expensive.

It has been found that the foregoing problems and deficiencies can be substantially avoided if zinc electrodes used in the zinc-chlorine battery are constructed in the new and improved manner of the present invention. In a preferred embodiment, each of the electrodes are essentially identical to one another and are each substantially rod-like shaped and are constructed of an electrolyte porous material and have a central axially directed electrolyte flow channel extending completely therethrough, or extending at least from one point on the electrode end surface into the interior of the electrode.

The simple rod shape of each of the electrodes permits simple and inexpensive fabrication of the electrodes, and they are interchangeable with one another and are symmetrical to permit easy assembly of the battery. Any number of rod pairs may then be mounted between spaced, parallel conductive plates to form a battery which can withstand high mechanical stress without damage to the sturdy rod-shaped electrodes.

U.S. Pat. No. 3,813,301 discloses a bipolar electrode having two sides joined in such a way as to form a channel for flow of electrolyte therebetween. The front side of one bipolar electrode and the back side of another bipolar electrcde form an electrolytic cell couple and the patent recommends that additives be employed to avoid formation of dendrites.

It is the object of this invention to provide a new and improved electrode and electrode system for use in a zinc-chlorine flowing electrolyte high energy density battery which is better adapted to withstand the stresses and strains in use and can be controlled so as to avoid significant formation of dendrites and black zinc and which simplifies the construction and assembly of the battery. Other objects of the invention will become apparent to those skilled in this art from the following detailed description in which:

FIG. 1 is an end plan view of a preferred embodiment of the new electrode;

FIG. 2 is a cross-section of the electrode shown in FIG. 1 taken along the section line 2—2 in FIG. 1;

FIG. 3 is a top view of a battery cell containing an assembly of the improved electrodes of the instant invention, with the top of the cell removed to expose the tops of the electrodes; and FIG. 4 is a cross-sectional view of FIG. 3 taken along the section line 4—4 of FIG. 3 and with the top of the cell in place.

SUMMARY OF THE INVENTION

This invention relates to new and improved flow through electrolyte zinc-chlorine high energy density battery electrodes and to the batteries containing such electrodes. More particularly, the invention relates to electrodes which are constructed of an aqueous metal chloride salt electrolyte porous material and the electrode is provided with an electrolyte flow channel extending from one point on the surface of the electrode to the interior of the electrode. In a preferred embodiment, each electrode is substantially rod shaped and has flat sides.

DESCRIPTION OF THE PREFERRED EMBODIMENTS

FIGS. 1 and 2 show a preferred embodiment of the electrode of the present invention. The electrode has a body 1 of a support material which is characterized by being porous to the aqueous metal chloride salt electrolyte, i.e., the aqueous zinc chloride which is circulated through the battery. This material is preferably a porous graphite but can also be an activated carbon of animal or vegetable origin, sintered titanium, sintered ruthenium oxide or the like. The porosity of body 1 will be such that about 20% to 80%, preferably about 30% to 60%, of a cross-section will be solid with the remainder being voids suitable to permit the flow of electrolyte therethrough. Usually the pores or passages will have an average diameter of about 5–300 microns, preferably about 10–100 microns, and most preferably about 25–50 microns. The porosity of body 1 will be such that at least about 0.001–10.0 ml/cm$^2$ of surface area/minute, preferably about 0.01–50 ml, of electrolyte will flow out of body 1 when the electrolyte pressure differential between the interior and exterior of the body 1 is about 0.01 to 1 kg/cm$^2$.

Body 1 can be of any desired configuration but it is preferably for use in a zinc-chlorine battery that the electrode has a substantially rod like shape, i.e. the altitude of the electrode is greater than the largest dimension perpendicular thereto. Preferably, the altitude is at least twice, and most desirably at least four times, the largest perpendicular dimension. Although the rod shaped electrode can have a cylindrical section, it is preferred to manufacture flat sided electrodes, for example, having square or triangular sections, because this provides a uniform electrode gap between facing zinc and chlorine electrodes.

During the charging of the high energy density secondary battery, zinc metal plates out on the electrode body and the zinc metal is consumed during discharging of the battery. Zinc deposited under normal conditions on a porous surface is inclined to be porous and therefore the entire electrode is electrolyte porous. FIGS. 1 and 2 show a zinc metal coating on body 1. Where the electrode of FIGS. 1 and 2 is to be a chlorine electrode, it is not coated with the zinc metal layer 2.

The electrode body 1 of FIGS. 1 and 2 is provided with an axial electrolyte flow channel 3 which extends through the body 1 and which at least begins at a point on the surface of the electrode and extends into the interior of body 1. In the preferred embodiment illustrated, flow channel 3 originates in the center of the bottommost horizontal face of the electrode and extends into the interior of body 1 along the central altitude axis. If desired, however, flow channel 3 could begin at any other point on the surface of the electrode and follow either a straight or tortuous path into the interior or even be split into a plurality of channels within body 1. Flow channel 3 does not extend all the way through the electrode but terminates within body 1. For ease in manufacture, however, it is preferred to cut channel 3 all the way through the electrode body 1 and then seal off one end opening by insertion of a suitable electrolyte impervious plug 4. The opposite ends of rod-shaped body 1 have circular counter-sunk openings 1a and 1b which can conveniently receive such plugs or suitable fluid connectors. Note that the body 1 is fully symmetric.

As shown by the arrows in FIG. 2, electrolyte is introduced through the surface opening of flow channel 3, travels through flow channel 3 but is blocked from exiting the opposite end by plug 4 and therefore passes through porous body 1 and porous zinc layer 2.

FIGS. 3 and 4 show a typical battery containing the electrodes of the instant invention. The cell illustrated has a cylindrical wall 5, which may be a nonconducting material such as glass; a top conductive plate 6; and a bottom conductive plate 7. The shape and dimensions and disposition of the cells can be varied as desired. Plates 6 and 7 may be of titanium, but, if desired, could be made of a nonconducting material, with additional means used to make electrical connection to the various electrodes. In FIGS. 3 and 4 there are six pairs of electrodes but the number of electrodes in a particular cell can be varied as required. There are six monopolar zinc electrodes 8 identical in configuration to the electrodes shown in FIG. 1 and six monopolar chlorine electrodes 9 which are preferably, but not necessarily, also identical in configuration to the electrodes shown in FIG. 1.

The tops of each of the bodies of chlorine electrodes 9 are plugged by a suitable disk-shaped insulation plug 4 which may be pressure fitted, or cemented into opening 1a of body 1. Plug 4 may be of Teflon if desired. The tops of the bodies 1 of chlorine electrodes 9 are then electrically and mechanically secured to conductive plate 6, as by a conductive cement, shown as conductive cement mass 4a in FIG. 4. The tops of each of zinc electrodes 8 have an insulation plug 18 fitted in their openings 1a, where the insulation plug 18 blocks the end of the channel 3 in the body 1. Plugs 18, which may be of Teflon, may be cemented or otherwise mechanically secured to their respective bodies 1, and to the plate 6.

The bottoms 1b of electrodes 9 are fitted with insulation plugs 17 which have central channels therethrough. Plugs 17 are then suitably mechanically secured to plate 7, but the bottom of bodies 1 are electrically insulated from plate 7. The bottoms of electrodes 8 are tightly press fit to plate 7. The surface of plates 6 and 7 which receives electrodes 8 and 9 may have suitable positioning tangs extending therefrom to properly locate the electrodes 8 and 9 relative to the plates 6 and 7.

The concentration of the zinc chloride in the electrolyte can be about 0.1% to saturation, preferably about 5–50%, and most usually about 10–35%. The electrolyte between electrodes 8 and 9 is usually maintained at a temperature of about 0–80° C, preferably about 15–40° C, and at a pressure of about 0.5–10 atmospheres, preferably about 1.0–5.0 atmospheres and most desirably about 2.0 atmospheres.

Top plate 6 is provided with an opening 10 communicating with a conduit line 11 for removal of gas and/or electrolyte from the cell. Further openings can be provided. Bottom plate 7 is provided with openings, each of which communicates with flow channels 3 of electrodes 8 and a conduit 13 which, in turn, is connected to the electrolyte supply. Bottom 7 is also provided with openings communicating with flow channels 3 of electrodes 9 and a conduit 15 which can serve as a return line to the electrolyte supply.

In one embodiment of the invention, the bodies 1 of rod-shaped porous electrodes 8 and 9 were constructed in accordance with the present invention from Airco-Speer grade 37 porous graphite having a square cross-section of about 6 mm × 6 mm and about 6 cm long. Each of the corners of the electrode were rounded at about 1 mm radius to avoid current concentration. A generally square cross-section electrolyte flow channel of about 3 mm × 3 mm was formed through the electrode, the axis of the circular channel lying on the central altitude of the electrode. One end of each electrolyte flow channel was fitted with a Teflon plug flush with the electrode surface, completely filling the flow channel and extending about 3 mm into the channel. Twelve of the electrodes were fitted into a battery cell having the configuration shown in FIGS. 3 and 4 except that insulating Teflon washers 17 and 18 were used to separate all of the electrodes from either the top or bottom of the cell. Wall 5 of the cell was a cylindrical glass enclosure having a 15.24 cm diameter and a 7.62 cm height.

During charging, an aqueous 25% zinc chloride solution was introduced through conduit 13 into flow channel 3 of zinc electrode 8. This electrolyte travels up the channels 3 in electrodes 8 and passes through porous body 1 and into the flow channels between electrodes 8 and 9 and to the discharge conduit 10. Electrolyte also flows from conduits 15 into channels 3 in electrodes 9, and into the flow channels between electrodes 8 and 9. Electrolyte stagnation at the faces of zinc electrodes 8 is prevented by having the electrodes constructed of porous material, whereby zinc deposited thereon during charging, also being porous, permits flow of electrolyte through electrodes 8. The flow of electrolyte through each zinc electrode 8 was regulated to be about one-fifteenth of a milliliter per minute per $cm^2$ at a charge current density of 20 $mA/cm^2$ and it was observed that a good quality zinc was deposited on the graphite electrode and was free of both dendrites and black zinc. It was found that the flowing electrolyte with less than 0.1 gram per liter of dissolved chlorine allowed a charge current efficiency of 90% to be attained easily. It was also found that the electrodes easily withstood the flowing electrolyte, substantial pressure and pressure differences encountered with no evidence of deformation or parts of the electrode being broken off. It was futher found that the battery cell generated 400 watt hours at 2 volts and 25 amperes. No additives were used since all presently known additives cause the zinc to tend to become non-porous, thus defeating the purpose of the invention.

It is essential that the zince electrode be porous and substantially dechlorinated electrolyte be flowed therethrough. The chlorine electrode is preferably, but not necessarily, porous. By substantially dechlorinated is meant a chlorine concentration of less than about 0.7 g/l, preferably less than about 0.2 g/l. In the foregoing example, employing an electrolyte containing 0.1 g/l Cl, a flow rate of 1/15th ml/min./$cm^2$, and a temperature of about 30° C, a charge current efficiency of 90% was achieved. Each additional 0.1 g/l of dissolved chlorine up to 0.7 g/l results in about a 3% loss in efficiency. Above 0.7 g/l, efficiency drops radically. The electrolyte used in bipolar systems typically contains about 2.5 g/l dissolved chlorine.

Various changes and modifications can be made in the electrodes and batteries of the instant invention without departing from the spirit and scope thereof. The various embodiments set forth herein were for the purpose of further illustrating the invention but were not intended to limit it.

I claim:

1. A zinc-chlorine high energy density battery comprising a chamber, means to withdraw gas from the chamber, at least one chlorine electrode within the chamber, at least one aqueous zinc chloride electrolyte porous zinc electrode within the chamber, means to introduce substantially dechlorinated electrolyte into the interior of the zinc electrode, and means to withdraw the electrolyte from the chamber.

2. The zinc-chlorine high energy density battery of claim 1, wherein the zinc electrode is a substantially rod like shaped body of material porous to aqueous zinc chloride electrolyte, all corners on the surface of which are rounded.

3. The zinc-chlorine high energy density battery of claim 2, wherein the rod shaped zinc electrode has a substantially square cross-section.

4. The zinc-chlorine high energy density battery of claim 3, wherein the means to introduce electrolyte into the interior of the zinc electrode is an electrolyte flow channel extending from a point on the surface of the zinc electrode into the interior thereof and wherein said battery additionally comprises means to introduce substantially dechlorinated electrolyte into said flow channel.

5. The zinc-chlorine high energy density battery of claim 4 containing a plurality of the zinc electrodes and a plurality of chlorine electrodes, each of said chlorine electrodes being constructed identically to said zinc electrodes, and means to separately introduce the electrolyte into each of said zinc electrodes.

6. A method of avoiding the formation of dendrites and black zinc on the zinc electrode of a zinc-chlorine high energy density battery which comprises constructing the zinc electrode from a material which is porous to aqueous zinc chloride electrolyte, flowing said electrolyte which has been substantially dechlorinated through said zinc electrode and employing a current density at which the formation of dendrites and black zinc is avoided.

7. The method of claim 6, wherein the electrolyte is flowed through said zinc electrode by introducing said electrolyte into the interior of said zinc electrode and causing the electrolyte to flow from the interior out of the electrode.

* * * * *